United States Patent [19]

Orihara et al.

[11] Patent Number: 5,129,137
[45] Date of Patent: Jul. 14, 1992

[54] METHOD OF MOUNTING A SPRING SEAT ON A HYDRAULIC DAMPING DEVICE

[75] Inventors: Hideaki Orihara; Tetsuro Isobe; Makoto Amano; Masashiro Kushida, all of Kanagawa, Japan

[73] Assignee: Atsugi Unisia Corp., Japan

[21] Appl. No.: 759,199

[22] Filed: Sep. 11, 1991

Related U.S. Application Data

[63] Continuation of Ser. No. 507,575, Apr. 11, 1990, abandoned.

[30] Foreign Application Priority Data

Apr. 13, 1989 [JP] Japan .................... 1-43457[U]

[51] Int. Cl.⁵ ............................................. B21D 39/00
[52] U.S. Cl. ................................. 29/523; 29/433; 29/445; 29/521
[58] Field of Search ............... 29/523, 433, 521, 522.1, 29/445, 890.122; 72/58, 61; 188/322.19; 280/668

[56] References Cited

U.S. PATENT DOCUMENTS

| 2,507,979 | 5/1950 | Kelar | 29/523 |
| 3,131,467 | 5/1964 | Thaller et al. | 29/523 |
| 4,145,036 | 3/1989 | Moonen et al. | |
| 4,251,094 | 2/1981 | Pinto | 29/523 |
| 4,660,269 | 4/1987 | Suzuki | 29/523 |
| 4,738,012 | 4/1988 | Hughes et al. | 29/523 |
| 4,782,571 | 11/1988 | Krips et al. | 29/523 |
| 4,795,010 | 1/1989 | Kaneko | 188/322.19 |
| 4,913,268 | 4/1990 | Parker et al. | 188/322.19 |

FOREIGN PATENT DOCUMENTS

| 0247586 | 5/1987 | Fed. Rep. of Germany . |
| 0268735 | 6/1987 | Fed. Rep. of Germany . |
| 3105170 | 8/1989 | Fed. Rep. of Germany . |
| 5029108 | 9/1975 | Japan . |
| 1350558 | 4/1974 | United Kingdom . |
| 2141802 | 1/1985 | United Kingdom . |

OTHER PUBLICATIONS

Boge article, (p. 16), German (no translation).

Primary Examiner—P. W. Echols
Assistant Examiner—David P. Bryant
Attorney, Agent, or Firm—Ronald P. Kananen

[57] ABSTRACT

A spring seat is disposed about a tube which forms part of a shock absorber and supported in a predetermined position thereabout. The tube is subject to press bulge formation so that a portion of the tube becomes force fitted against a portion of the spring seat. Dies can be used to induce the formation of one or more projections which prevent the spring seat from moving axially along the tube. The force fit prevents relative rotation.

3 Claims, 2 Drawing Sheets 5,129,137

METHOD OF MOUNTING A SPRING SEAT ON A HYDRAULIC DAMPING DEVICE

This application is a continuation of application Ser. No. 07/507,575 filed Apr. 11, 1990, now abandoned.

BACKGROUND OF THE INVENTION

1. Field of the Invention

The present invention relates generally to a hydraulic damping device such as a shock absorber and more specifically to a method of connecting a spring seat to the body of the device.

2. Description of the Prior Art

JU-B-50-29108 discloses an arrangement wherein a plurality of mounting projections are formed on the reservoir tube of a shock absorber and used to locate a spring seat in a predetermined desired position. The seat once mounted on the projections is arc welded in place.

However, this arrangement has suffered from the drawback that the arc welding process requires a special type of welding wire which is quite expensive. Accordingly, the cost of the device is undesirably raised.

SUMMARY OF THE INVENTION

It is an object of the present invention to provide a method of attaching a spring seat or the like type of element to a device such as a hydraulic shock absorber or the like, which reduces the overall cost of the final product.

In brief, the above object is achieved by a connection technique wherein a spring seat is disposed about a tube which forms part of a shock absorber and supported in a predetermined position thereabout. The tube is subject to press bulge formation so that a portion of the tube becomes force fitted against a portion of the spring seat. Dies can be used to induce the formation of one or more projections which prevent the spring seat from moving axially along the tube. The force fit prevents relative rotation.

More specifically, the present invention is deemed to comprise a method of connecting an annular member to a tubular member comprising the steps of: disposing the annular member about the tube so that an essentially tubular portion thereof juxtaposes the outer surface of the tubular member; and press bulge forming the tubular member so that a portion thereof becomes force fitted against the inner surface of the essentially tubular portion of the annular member.

DESCRIPTION OF THE PREFERRED EMBODIMENTS

Figure 1:
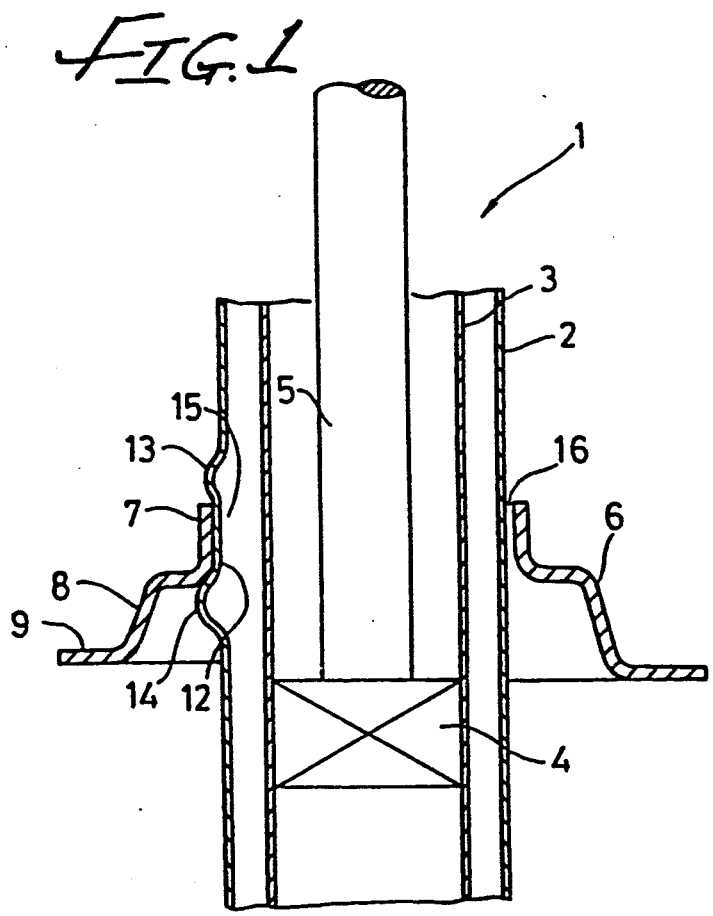
FIG. 1 is a sectional view showing a connection technique according to the present invention.
Figure 2:
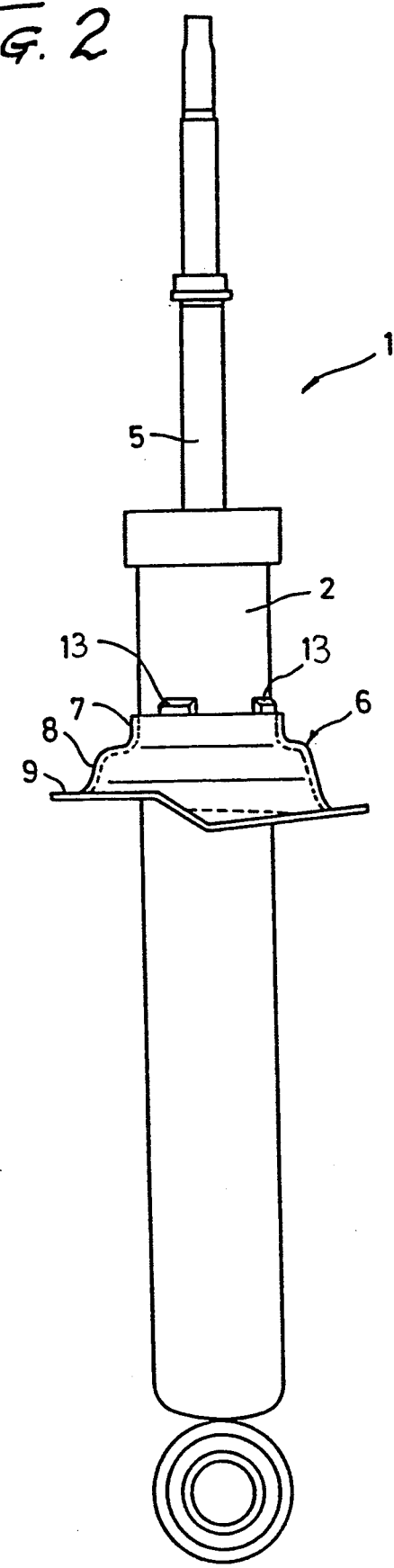
FIG. 2 is a an elevation of a shock absorber provided with a spring seat using the inventive technique.

FIGS. 1 and 2 show a shock absorber 1 of the type which comprises concentrically arranged reservoir and cylinder tubes 2, 3. A piston 4 and piston rod 5 are reciprocatively disposed within the cylinder tube 3 in the illustrated manner.

A spring seat 6 is fixed to the external surface of the reservoir tube 2. As shown, this seat comprises a tubular portion 7, a spring guide portion 8 which induces the spring (not shown) to center, and a radially extending flange portion 9. Prior to connection the internal diameter of the tubular portion is slightly greater than the reservoir tube.

Figure 3:
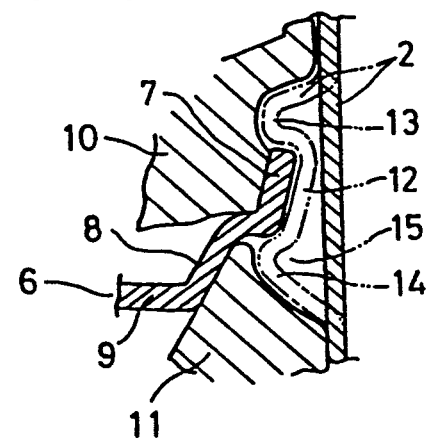
FIG. 3 is a enlarged sectional view which highlights the connection technique which characterizes the present invention.

In order to connect this spring seat in place, the tubular portion 7 is disposed about the outer periphery of the reservoir tube 2 and supported at the desired position. Following this dies 10 and 11 are arranged above and below the tubular portion 7 and set in predetermined positions on the outer surface of the reservoir tube 2 in the manner shown in FIG. 3. Following this the reservoir tube 2 is subject to press bulge formation.

In this particular embodiment, the dies 10 and 11 are so shaped and arranged that upon distortion of the reservoir tube, the spring seat is held in place so that a force or press fit is developed between the inner surface of the tubular portion 7 and portion (or portions) 12 of the reservoir tube which is forced outwardly into contact therewith. In addition to this, three sets of essentially equidistantly spaced projections 13 and 14 are formed above and below the tubular portion 7 to prevent the movement of the spring seat in the axial direction of the reservoir tube.

Thus, when a bias is applied to the spring seat by a spring (not shown), such as when used in an automotive application, the load is born predominantly by the projections 14. Further, as the outwardly distorted portion 15 is force fitted against the tubular portion 7 of the spring seat, rotation of the spring seat with respect to the reservoir tube is prevented.

In the case the formation of the projections 13 and 14 is not necessary, is is possible to dispense with the dies 10 and 11, use a jig to support the spring seat at a predetermined height and perform the bulge formation in a free state.

In the instant invention a drain channel or gutter 16 (see FIG. 1) is formed in a recess defined between projecting portions 15 for the purposes of permitting rain water and the like to drain away in a manner which tends to inhibit rusting and the like.

What is claimed is:

1. A method of connecting an annular member to a tubular member comprising the steps of disposing the annular member about the tubular member so that an essentially tubular portion thereof juxtaposes the outer surface of the tubular member; and press bulge forming the tubular member so that a portion thereof becomes force fitted against the inner surface of the essentially tubular portion of said annular member and a channel is formed which extends between the tubular member and the annular member essentially in the axial direction of said tubular member.

2. A method of connecting an annular member to a tubular member comprising the steps of:

disposing the annular member about the tubular member so that an essentially tubular portion thereof juxtaposes the outer surface of the tubular member;

disposing a die about the tubular member so that when the tubular member is subject to press bulge formation at least one projection and at least one channel are formed on said tubular member, the projection engaging both said annular member and said die for preventing the annular member from moving axially along the tubular member, the channel defining a space with a given distance between the annular member and the tubular member; and press bulge forming the tubular member so that a portion thereof becomes force fitted against said die and the inner surface of the essentially tubular portion of the annular member.

3. A method as set forth in claim 2, wherein the projection is provided with a pair of projecting portions which extend essentially in a circumferential direction of the tubular member with a gap therebetween, the annular member being retained, by said projecting portions, within said gap, the channel extending in the axial direction of the tubular member across a portion of the tubular member which is defined between the pair of projecting portions.

* * * * *